Figure 2:
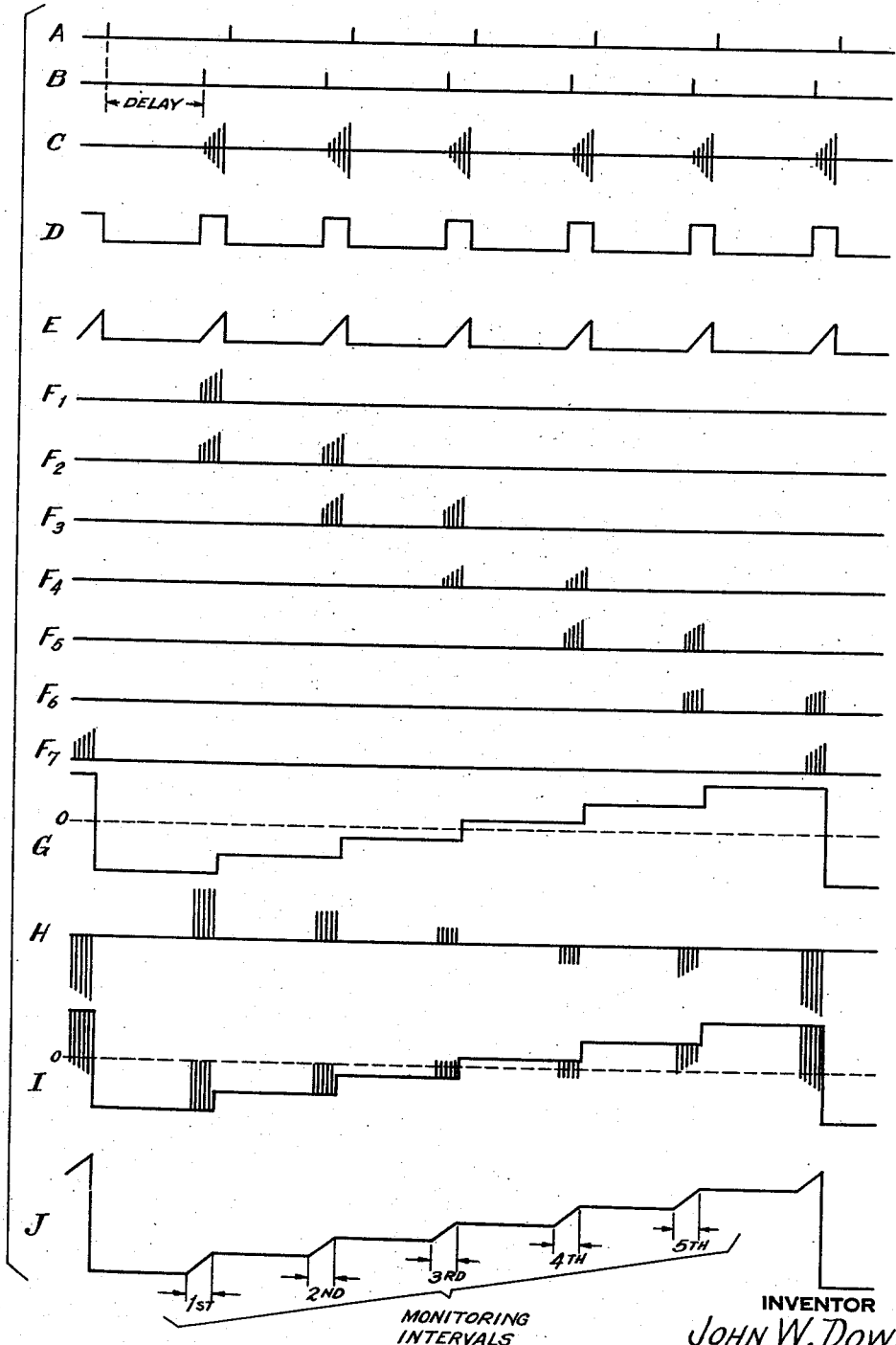

Feb. 16, 1965   J. W. DOWNS   3,170,156
GAIN MONITORING SYSTEM FOR A HEIGHT-FINDING RADAR
Filed Dec. 2, 1955   2 Sheets-Sheet 1
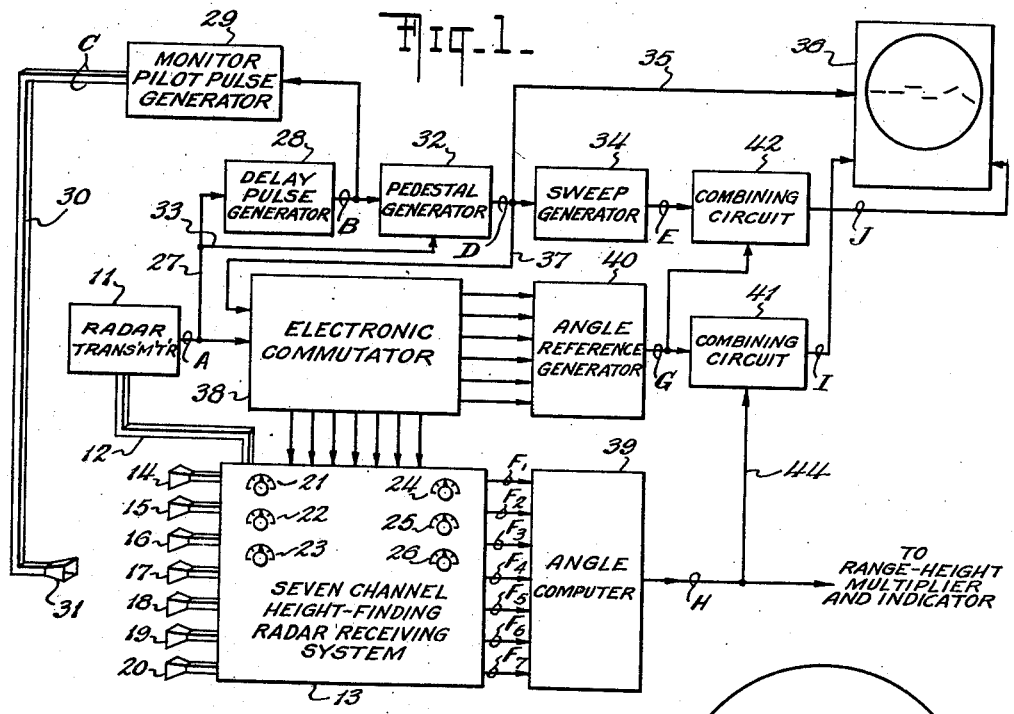
Fig. 1.
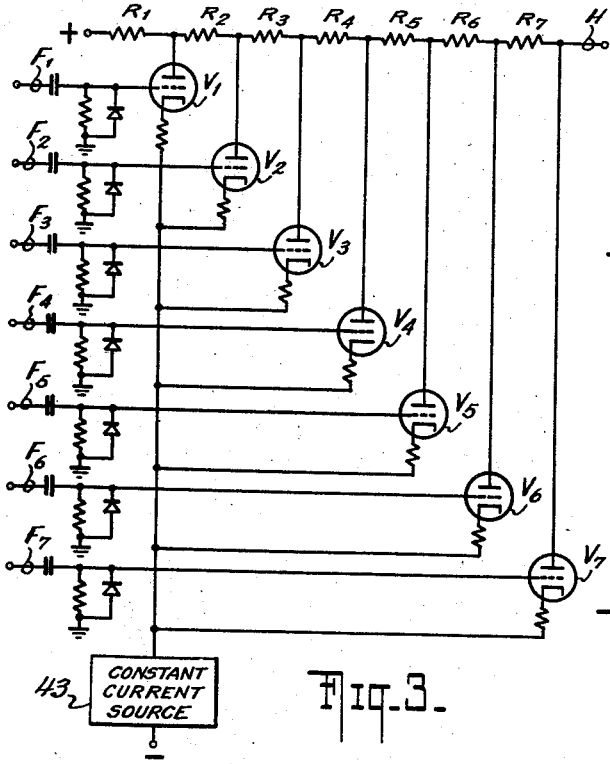
Fig. 3.
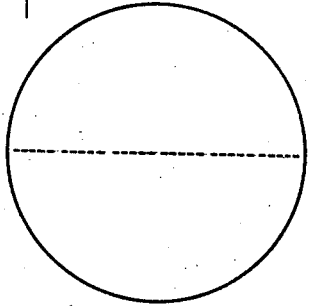
Fig. 4.
Fig. 5.
INVENTOR
JOHN W. DOWNS
BY
ATTORNEY ns Patent Office 3,170,156
Patented Feb. 16, 1965

3,170,156
GAIN MONITORING SYSTEM FOR A HEIGHT-FINDING RADAR
John W. Downs, Eau Gallie, Fla., assignor to Sperry Rand Corporation, a corporation of Delaware
Filed Dec. 2, 1955, Ser. No. 550,574
5 Claims. (Cl. 343—17.7)

This invention relates to monitoring systems, and in particular to a system for monitoring the gains of a multi-channel receiver of a height-finding radar system.

In one type of height-finding radar system, the height of the selected target is determined by employing a plurality of receiving channels having a plurality of overlapping receptivity beam patterns in elevation. The elevation angle of the selected target is measured by determining which of the channels of the receiving system produces the largest output target signals. If signals appear at the outputs of adjacent channels from the same target, the elevation angle of the target is determined by interpolating between the two output target signals. The height of the selected target is then determined by multiplying the range to the target by a voltage proportional to the sine of the elevation angle.

The accuracy of the measured elevation angle of the selected target in this type of system is dependent upon the existence of equal gains in all of the receiving channels. This necessitates some means for monitoring and adjusting the gains of the receiving channels if high accuracy in elevation angle measurements is to be maintained under varying operating conditions. The present invention is concerned with an improved gain monitoring system for this type of radar.

A primary object of the invention is to provide a simple and reliable system for monitoring the IF and video amplifier gains of a multi-channel receiving system.

Another object of the invention is to provide an improved cathode-ray tube presentation of the difference in gains between adjacent channels of a multi-channel receiving system.

Still another object of the invention is to monitor the angle computer of a height-finding radar system.

In accordance with the present invention there is introduced an improved system for monitoring the gains of a multi-channel receiver. The monitoring system includes a pilot pulse generator producing recurrent pulses to be received by each channel of the receiving system. Pairs of adjacent receiving channels whose gains are to be compared are recurrently switched on together during selected time intervals. The amplified pilot pulses from these channels are supplied to a computer which produces recurrent output pulses whose amplitude varies according to changes in the gains of these adjacent channels. The amplitudes of the recurrent output pulses have a predetermined value when the gains of these channels are equal. A reference generator is coupled to the pilot pulse generator and produces a recurrent reference voltage whose amplitude during the time intervals that selected adjacent pairs of channels are switched on together is fixed and equal to the predetermined value of the output pulses from the computer during these time intervals. Different pairs of adjacent channels are switched on during different time intervals until the gains of all the channels of the receiving system have been adjusted. To facilitate this adjustment of the gains of the channels, a cathode-ray tube indicator is provided to indicate the difference between the output pulses from the computer and the reference voltage from the reference generator. A sweep voltage synchronized by the output pulses from the pilot generator produces a sweep voltage for deflecting the beam of the cathode-ray tube indicator during the selected intervals that pairs of adjacent channels are switched on together. The gains of all of the adjacent pairs of channels of the multi-channel receiving system are compared during each sweep cycle. When the gains of all the receiving channels are equal, the cathode-ray tube indicator displays a series of horizontal deflections aligned along a straight line extending through the center of the face of the cathode-ray tube.

The above objects of and the brief introduction to the present invention will be more fully understood and further objects and advantages will become apparent from a study of the following detailed description in connection with the accompanying drawings, wherein FIG. 1 is a block diagram of the gain monitoring system of the present invention as employed to compare the gains between adjacent channels of a height-finding radar system.

FIG. 2 illustrates the waveforms of voltages associated with the gain monitoring system of FIG. 1, FIG. 3 is a simplified schematic diagram of the angle computer used with the multi-channel receiver of the height-finding radar system, FIG. 4 is a cathode-ray tube display illustrating the condition when the gains in certain of the adjacent channels are unequal, and FIG. 5 is a cathode-ray tube display illustrating the condition when the gains in all of the receiving channels are equal.

Referring to FIG. 1, radar transmitter 11 produces short recurrent output pulses of radio-frequency energy which is coupled over a section of waveguide 12 to a seven-channel height-finding radar receiving system 13. Multi-channel receivers for height-finding radar systems are known in the art. The radio-frequency pulses are coupled through seven duplexers situated within the receiving system 13 to simultaneously excite the seven horns 14 through 20. These horns may serve as feeds for a parabolic reflector which radiates a broad beam of energy into space.

The seven superheterodyne receiving channels of receiving system 13 are identical and each channel includes a mixer, an IF pre-amplifier, a logarithmic IF amplifier and detector, and a video amplifier. A single local oscillator is coupled to the seven mixers. The mixer of the first receiving channel is coupled through a duplexer to horn 14, and the mixers for the channels two through seven are coupled respectively through duplexers to the horns 15–20. Each IF pre-amplifier in the seven channels is provided with a gain control for setting the IF gain. The IF gain controls for the first three channels are identified by the numerals 21, 22 and 23. Each of the video amplifiers in the seven channels is provided with a video gain control. The video gain controls for the first three channels are identified by numerals 24, 25, and 26.

The seven horns 14–20 provide seven separate beam patterns in space and the directive axes of the seven beam patterns extend in seven different elevation directions. The beam patterns of adjacent horns overlap in space. The elevation of a target is measured by determining which of the horns 14–20 receive the strongest echo pulses. If the target in space is located along the directive axes of the beam of horn 14, the first channel of the receiving system 13 will produce stronger target output pulses than the remaining six channels. Similarly, if a target in space is located midway between the directive axes of the beams of horns 14 and 15, the first and second receiving channels will produce target output pulses equal in amplitude if the gains of the first and second receiving channels are equal. Since the output pulses from the first and second channels are dependent upon the gains of these channels as well as the elevation angle of the target, it is necessary that both the IF amplifier gains and the video amplifier gains of the first and second channels be equal if the elevation angle of the target in space is to be accurately determined. The monitoring system of this invention provides an improved method by which the IF and video amplifier gains in the seven receiving channels may be compared and adjusted while the height-finding radar system is operating.

The gains of the seven receiving channels are compared during the "dead time" of the radar system by supplying locally generated pilot pulses to the seven receiving channels and adjusting the gains of the channels until equal output pulses are obtained from each channel. The pilot pulses are synchronized by the trigger pulses from the radar transmitter 11 which are coupled over lead 27 to the input of a delay pulse generator 28. These trigger pulses are illustrated as waveform A in FIG. 2, and activate the delay pulse generator 28 to produce the delayed recurrent output pulses of waveform B. The time delay between the recurrent trigger pulses of waveform A and the delayed pulses of waveform B corresponds to the "live time" of the radar system. The time interval between a delayed pulse of waveform B and the next occurring radar trigger pulse on lead 27 corresponds to the "dead time" of the radar system.

The delayed pulses activate the monitor pilot pulse generator 29 to produce a group of five radio-frequency pulses which occur during each "dead time" interval. These radio-frequency pulses are illustrated as waveform C in FIG. 2, and the difference in peak power between adjacent pulses in the group is equal to 12 decibels. The five radio-frequency pilot pulses are of different peak powers to simulate echo pulses from different size targets to check the dynamic range of the receiving system. These pilot pulses are coupled over a section of wave guide 30 to a horn 31 which is situated in front of the horns 14-20. These pilot pulses uniformly illuminate the receiving horns so that each channel of the receiving system 13 receives pulses of the same strength.

The delayed pulses of waveform B are also supplied to the input of a pedestal generator 32. The pedestal generator may be an Eccles-Jordan circuit which is activated by the delayed pulses of waveform B and which is terminated by the radar trigger pulses supplied from radar transmitter 11 over leads 27 and 33. The pedestal generator produces recurrent rectangular output pulses of waveform D which occur during the "dead times" of the radar system. This rectangular voltage is supplied to the input of sweep generator 34, over lead 35 to the intensity grid of a cathode-ray tube indicator 36, and over lead 37 to the electronic-commutator 38. Sweep generator 34 produces a sweep voltage of waveform E which occurs during the "dead time" intervals of the radar system. The pedestal voltage on lead 35 gates on the cathode-ray beam of indicator 36 during the "dead time" intervals of the radar system.

The gains of the IF and video amplifiers of the seven channels are compared in pairs, the first and second channels being compared during first monitoring intervals and the second and third channels being compared during second monitoring intervals. Six separate monitoring intervals are required to compare the gains between adjacent channels of the seven channel receiving system. One complete monitoring cycle consisting of six monitoring intervals is completed each six radar cycles.

The electronic commutator 38 is activated by the radar trigger pulses of waveform A and is responsive to the pedestal pulses of waveform D for providing seven separate gating voltages for switching the seven receiving channels so that adjacent channels are switched on together during a monitoring interval. Six different pairs of adjacent channels are switched on in sequence each complete monitoring cycle. These gating voltages are coupled to the IF pre-amplifiers in the seven receiving channels. During the normal operation of the radar system, all seven channels operate simultaneously. During the "dead time" intervals of the radar system only adjacent channels are responsive at the same time. The gating pulses supplied to the first and second channels allow these channels to be responsive to targets in space whose heights are to be determined during the "live time" of the radar system and to be responsive to the pilot pulses radiated from antenna 31 during the "dead time" of the radar system. During the first monitoring interval the channels three through seven are rendered non-responsive to the pilot pulses radiated from antenna 31. Similarly, during the second monitoring interval, channels two and three must respond to the pilot pulses from antenna 31 within the "dead time" of the radar system while channels one and four through seven are rendered non-responsive to the pilot pulses.

The output pilot pulses from the first receiving channel appearing as waveform $F_1$ in FIG. 2 are coupled to the input of angle computer 39. Similarly, the output pilot pulses from channels two through seven appearing as waveforms $F_2$–$F_7$ respectively, are coupled to the angle computer 39.

The electronic commutator 38 also supplies six separate gating voltages to the angle reference generator 40. Each of these gating voltages has an "on" period equal to one radar cycle, and an "off" period equal to five radar cycles. The "on" periods of the six switching voltages occur during six different radar periods and follow one another in sequence so that no two "on" periods occur at the same time. The angle reference generator 40 produces a stepped or staircase output voltage illustrated as waveform G in FIG. 2. The staircase output voltage has a recurrence frequency equal to one-sixth of the radar repetition frequency. Each step of waveform G has a predetermined selected magnitude determined according to the characteristics of the angle computer 39 as will be explained hereinafter. The staircase output voltage is coupled to the combining circuits 41 and 42.

The angle computer 39 which is an integral part of the height-finding radar system is shown in more detail in FIG. 3. The computer includes seven triode tubes $V_1$ through $V_7$ corresponding to the seven receiving channels. The control electrodes of tubes $V_1$ through $V_7$ are coupled respectively to the output of channels one through seven of receiving system 13. The cathodes of the tubes are each coupled through a cathode resistor to a common conductor and from the common conductor through a constant direct current source 43 to ground. The anodes of tubes $V_1$–$V_7$ are coupled as shown to a series network of resistors $R_1$–$R_7$. The resistor $R_1$ is coupled from the anode of $V_1$ to a fixed positive potential. The output from the computer is taken from the anode of $V_7$.

In the absence of applied pulses, the angle computer of FIG. 3 produces a fixed direct output voltage from the anode of $V_7$ to ground whose value is determined by the voltage drop in the series resistors $R_1$–$R_7$. With no applied signal each of the tubes $V_1$ through $V_7$ draws the same current, and the total current drawn by all the tubes is equal to the constant direct current supplied by the direct current source 43. Thus, each tube passes a unit of current equal to one-seventh of the value of the constant direct current. The voltage drop across the resistors $R_1$–$R_7$ may be computed by multiplying the amount of current which flows through each resistor by the resistance of each resistor. The unit of current which flows through tube $V_7$ also flows through resistor $R_7$. Two units of current must flow through resistor $R_6$, one of which flows through tube $V_6$ and the other unit flows through resistor $R_7$ and tube $V_7$. Three units of current flow through resistor $R_5$, four units through resistor $R_4$ and so forth until seven units of current flow through resistor $R_1$.

During the first monitoring interval video pulses of waveforms $F_1$ and $F_2$ are supplied to the inputs of tubes, $V_1$ and $V_2$. If the IF and video amplifier gains in the first and second receiving channels are equal, the amplitudes of the video pulses of waveform $F_1$ will be equal to the amplitudes of the video pulses of waveform $F_2$. The absolute amplitudes of these video pulses have been selected so that for normal IF and video amplifier gains each pulse of the group of five pulses of waveforms $F_1$ and $F_2$ will cause tubes $V_1$ and $V_2$ to pass all of the current which the constant direct current source can supply. Thus, each tube $V_1$ and $V_2$ will pass three and one-half units of current. The tubes $V_3$ through $V_7$ will be cut off while $V_1$ and $V_2$ are conducting because as $V_1$ and $V_2$ conduct the cathode to ground potential of tubes $V_3$ through $V_7$ is raised above the value needed to cut off these tubes. Seven units of current will flow through resistor $R_1$ as before while only three and one-half units of current will flow through resistor $R_2$. No current will flow through the resistors $R_3$ through $R_7$. Thus, the sum of the voltage drops across the resistors $R_1$ through $R_7$ is now less than the case when no signal was present at the control electrodes of the computer tubes $V_1$–$V_7$. The output from the computer 39 during the first monitoring interval is a group of five positive video pulses as illustrated in waveform H. Tubes $V_1$ and $V_2$ pass the same current during each pulse of the group of five pilot video pulses of waveforms $F_1$ and $F_2$, and the amplitudes of the five output pulses of waveform H during the first monitoring interval are constant and equal.

If video pulses were applied solely to the input of tube $V_1$, it would pass all seven units of current and the positive output pulses from the computer would have a first constant predetermined magnitude. If video pulses were applied solely to the input of tube $V_2$, $V_2$ would pass all seven units of current and the positive output pulses from the computer would have a second constant predetermined magnitude different from the first constant predetermined magnitude. The difference in magnitude between the output pulses when $V_1$ passes all the current and the output when $V_2$ passes all the current is a particular constant value. The magnitude of each step of the output voltage of waveform G from the angle reference generator is adjusted to equal this particular constant value.

If the amplitudes of the video output pulses of waveforms $F_1$ and $F_2$ were to increase together by the same amount during the first monitoring interval, the positive output pulses of waveform H from the computer would remain unchanged since tubes $V_1$ and $V_2$ are passing all the current available from the constant current generator 43. If the pulses of waveform $F_1$ were larger than the pulses of waveform $F_2$, $V_1$ would pass a larger current than $V_2$ and the positive output pulses of waveform H during the first monitoring interval would increase. This result would be obtained, for example, if the IF gain of the first channel were larger than that of the second channel. The amplitudes of the output pulses of waveform H during the first monitoring interval have a predetermined value when the IF and video amplifier gains of the first and second channels are equal.

During the second monitoring interval, the second and third channels are gated on simultaneously and are jointly responsive to the pilot pulses. If the amplitudes of the video pulses of waveforms $F_2$ and $F_3$ are equal, tubes $V_2$ and $V_3$ will each pass three and one-half units of current. For this condition, three and one-half units of current flow through tube $V_3$ and resistor $R_3$. Seven units of current flow through resistors $R_2$ and $R_1$. Tubes $V_1$ and $V_4$ through $V_7$ are cut off. The amplitudes of the positive output pulses of waveform H during the second monitoring interval are smaller than during the first monitoring interval because there exists a greater voltage drop in the series resistors $R_1$, $R_2$ and $R_3$ than existed in resistors $R_1$ and $R_2$ during the first monitoring interval. The positive output pulses during the second monitoring interval have a predetermined peak value when the IF and video amplifier gains of the second and third channels are equal, and this predetermined value is different from the predetermined value of the output pulses during the first monitoring interval.

If the IF and video amplifier gains were identical in all seven channels during the normal operation of the height-finding radar system, the angle computer 39 would produce output pulses whose amplitudes are a function of which of the receiving channels is receiving target echo pulses. In other words, the amplitudes of the output pulses from the angle computer vary according to the elevation angle of the targets in space returning echo pulses.

Since the sine of small angles is approximately proportional to the angle itself, the output pulses from the angle computer vary according to the sine of the elevation angle for small angles. It should be noted that by proper selection of the values of the resistors $R_1$ through $R_7$ in the angle computer that the output pulses from the angle computer may be made to vary according to the sine of the elevation angle even for large angles.

During the comparison of the gains between any pair of adjacent channels during a monitoring interval, the amplitudes of the output pulses from the angle computer vary according to the ratio of the IF amplifier gains of the two channels. This mathematical relationship exists because logarithmic IF amplifiers are employed in each channel of the multi-channel receiver and the angle computer 39 is responsive to the difference between the output voltages from adjacent channels. However, the amplitudes of the output pulses from the angle computer do not vary according to the ratio of the video amplifier gains of the two channels but vary as a function of the difference in gains between the video amplifiers. This mathematical relationship exists because the video amplifiers in the seven channels are located at the output of the logarithmic IF amplifiers and changes in video amplifier gain are not subject to a logarithmic transformation.

The output pulses from each channel vary differently with a change in IF amplifier gain as compared to a change in video amplifier gain. This may be explained by referring to the group of five pulses of waveform $F_1$ at the output of the first channel. Each pulse of the group has a different peak amplitude. Due to the logarithmic characteristic of the IF amplifier, a change in IF gain causes the amplitude of each pulse of the group to increase by substantially the same amount so that the slope of an imaginary line joining the peaks of the five pulses remains unchanged. If the amplitude of the first pulse of the group increases by one unit, the amplitudes of the remaining pulses of the group increase by one unit. However, a change in video amplifier gain causes each pulse of the group to increase not by the same absolute amount but by the same percentage. In other words, if the first pulse of the group should double in amplitude, the other pulses of the group will likewise double in amplitude. Thus, the slope of an imaginary line joining the peaks of the five pulses changes with changes in video gain.

The output pulses of waveform H from computer 39 also vary in shape with changes in the gain of the IF and video amplifiers of the pair of channels whose gains are being compared. During the first monitoring interval the slope of the five pulses of waveform $F_1$ at the output of the first channel is equal to the slope of the pulses of waveform $F_2$ at the output of the second channel. For this condition, the gains of the video amplifiers of the first and second channels are equal. The amplitudes of each of the five pulses of waveform $F_1$ are equal to the amplitudes of each of the five pulses of waveform $F_2$ which corresponds to the condition when the gains of the first and second IF amplifiers are equal. The amplitudes of the output pulses of waveform H during the first monitoring interval are constant.

During the third and fourth monitoring intervals, the amplitudes of each of the pulses of waveform $F_4$ from the fourth channel are smaller than the amplitudes of the corresponding pulses of waveform $F_3$ and $F_5$ from the third and fifth channels respectively, indicating that the gain of the IF amplifier in the fourth channel is low. The slopes of the groups of pulses of waveforms $F_3$, $F_4$, and $F_5$ are equal indicating that the video gains in the third, fourth, and fifth channels are equal. Tube $V_4$ in computer 39 passes a smaller current during each of the pulses of waveform $F_4$ than does tube $V_3$ during the third monitoring interval. As a result, the amplitudes of the group of positive pulses of waveform H at the output of the computer during the third monitoring interval are larger than the case where the IF gains of the third and fourth channels are equal. Similarly, the amplitudes of the group of negative pulses of waveform H during the fourth monitoring interval are larger than would have been the case if the IF gains of the fourth and fifth channels had been equal.

During the fifth and sixth monitoring intervals the slope of the group of pulses of waveform $F_6$ is less than the slope of the group of pulses of waveforms $F_5$ and $F_7$ indicating that the gain of the video amplifier of the sixth channel is low. As a result, the tube $V_6$ of computer 39 passes a different current during each pulse of the group of pulses. Similarly, tubes $V_5$ and $V_7$ pass a different current during each pulse of the groups of five pulses during the fifth and sixth monitoring intervals, respectively. The current flowing through $V_6$ progressively decreases as the amplitudes of successive pulses of waveform $F_6$ increase while the current flowing through the tubes $V_5$ and $V_7$ progressively increase as the amplitudes of the successive pulses of waveforms $F_3$ and $F_7$ increase. Because of the different current distribution between tubes $V_5$ and $V_6$ with each succeeding pulse, the output pulses of waveform H from computer 39 will have a sloping amplitude distribution during the fifth monitoring interval. Similarly, the different current distribution between tubes $V_6$ and $V_7$ with each succeeding pulse during the sixth monitoring interval causes the output pulses of waveform H to have a sloping amplitude distribution.

The video output pulses of waveform H are supplied from angle computer 39 to a range-height multiplier and indicator external to the block diagram of FIG. 1. These video pulses are also supplied over lead 44 to the combining circuit 41 where they are combined with the reference output voltage of waveform G from the angle reference generator 40. The combined voltages of waveforms H and G appear at the output of combining circuit 41 as waveform I which is supplied to the vertical deflection circuits of the cathode-ray tube indicator 36.

The recurrent sweep voltage of waveform E and the reference voltage of waveform G are supplied to combining circuit 42. The combining circuit 42 produces a composite sweep voltage as illustrated by waveform J in FIG. 2, and this composite sweep voltage is supplied to the horizontal deflection circuits of the cathode-ray tube indicator 36. The peak value of sawtooth voltage of waveform E is equal to the value of the steps of the voltage of waveform G. An analysis of waveform J shows that six separate sweep or monitoring intervals occur for each complete cycle of the composite sweep voltage. One complete sweep cycle occurs each six radar periods.

During each monitoring interval the display on the face of the cathode-ray tube indicator appears as five horizontal bars corresponding to the five pilot pulses as illustrated in FIGS. 4 and 5. Where the amplitudes of the five positive pulses of waveform H during the first monitoring interval is exactly balanced or offset by the negative value of the reference voltage of waveform G during the first monitoring interval, the five bars will be displayed along a line extending horizontally through the center of the face of the cathode-ray tube indicator. This display during the first monitoring interval represents the difference between the amplitude of the five positive pulses of waveform H and the negative value of waveform G. From waveform I of FIG. 2 it can be seen that the difference between waveforms H and G during the first monitoring interval is zero.

During the second monitoring interval the cathode-ray tube indicator displays a second series of five bars corresponding to the five pilot pulses, and these bars will appear along the same horizontal line through the center of the face of the cathode-ray tube when the positive pulses of waveform H are exactly balanced or offset by the negative value of waveform G. The cathode-ray tube indicator serves as a null indicator and changes of gain in the vertical deflection amplifier will have no effect upon the display so long as the difference between the amplitudes of the pulses of waveform H are exactly balanced or offset by the reference voltage of waveform G.

The gain of the vertical deflection amplifier of the cathode-ray indicator is set sufficiently high so that the portions of waveform I corresponding to waveform G do not appear on the face of the cathode-ray tube. In other words, the cathode-ray tube indicator displays only the portion of waveform I which is very nearly equal to zero or null between waveforms G and H as represented by the broken line extending through waveform I.

The display of FIG. 4 indicates that the IF and video amplifier gains of the first, second, and third channels of receiving system 13 are substantially equal. The IF gain control 21 and video gain control 24 of the first channel have been arbitrarily set to a desired value and the IF gain control 22 and video gain control 25 have been adjusted so that the gain of the second channel is equal to the gain of the first channel. Similarly, the gain controls 23 and 26 of the third channel have been properly adjusted. However, during the third monitoring interval the IF gain of the fourth channel is higher than the IF gain of the third channel as indicated by the cathode-ray tube display. By adjusting the IF gain of the fourth channel the position of the series of five bars occurring during the third monitoring interval may be lowered so as to fall upon the null or zero line. While reducing the IF gain in the fourth channel, the series of five bars appearing on the face of the cathode-ray tube during the fourth monitoring interval will be positioned upward toward the null line since the cathode-ray tube display indicates that the IF gain of the fourth channel is high with respect to the IF gain of the fifth channel.

During the fifth monitoring interval the cathode-ray tube display indicates that the video gain of the sixth channel is improperly adjusted with respect to the video gain of the fifth channel. By raising the video gain of the sixth channel the slope of the five bars appearing on the face of the cathode-ray tube during the fifth monitoring interval will decrease until they become horizontal and coincide with the null line extending horizontally through the center of the face of the cathode-ray tube indicator. While raising the video gain of the sixth channel, the slope of the five bars appearing during the sixth monitoring interval will likewise decrease and become horizontal indicating that the video gain of the sixth channel has been adjusted to equal the video gain of the seventh channel. Proper adjustment of the IF and video amplifier gains in the seven receiving channels of receiving system 13 will produce a cathode-ray tube display as illustrated in FIG. 5.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gain monitoring system for a multi-channel receiving system, said gain monitoring system including a pilot pulse generator means producing recurrent pulse-modulated pilot signals to be received by each channel of said multi-channel receiving system, means for comparing the gains of adjacent channels of said multi-channel receiving system, comprising in combination, switching means coupled between said pilot pulse generator means and said multi-channel receiving system for recurrently activating a first pair of adjacent channels during first monitoring intervals, each of said first pair of adjacent channels producing recurrent output pulses, computer means coupled to the output of said receiving system and responsive to the output pulses during said first monitoring intervals for producing recurrent video output pulses whose magnitude varies according to the ratio of the voltage gains of said first pair of adjacent channels, the magnitude of said video output pulses having a predetermined value when the gains of said first pair of adjacent channels are equal, reference generator means coupled to said switching means for producing a recurrent reference voltage, the magnitude of said reference voltage having a fixed value equal to the predetermined value of said video output pulses from said computer means when the gains of said pair of adjacent channels are equal, and indicator means coupled to the output of said computer means and to the output of said reference generator means for indicating the difference between said video output pulses from said computer means and said recurrent reference voltage.

2. In a gain monitoring system for a multi-channel receiving system, said gain monitoring system including a pilot pulse generator means producing recurrent pulse-modulated pilot signals to be received by each channel of said multi-channel receiving system, means for comparing the gains of a first pair of adjacent channels during first monitoring intervals and a second pair of adjacent channels during second monitoring intervals comprising in combination, switching means coupled between said pilot pulse generator means and said multi-channel receiving system for recurrently activating said first pair of adjacent channels during said first monitoring intervals and said second pair of adjacent channels during said second monitoring intervals, computer means coupled to the output of said receiving system and responsive to the output pulses from said first pair of adjacent channels during said first monitoring intervals for producing first video output pulses whose magnitude varies according to the ratio of the voltage gains of said first pair of adjacent channels, the magnitude of said first video output pulses having a first predetermined value when the gains of said first pair of adjacent channels are equal, said computer means being further responsive to the output pulses from said second pair of adjacent channels during said second monitoring intervals for producing second video output pulses whose magnitude varies according to the ratio of the voltage gains of said second pair of adjacent channels, the magnitude of said second video output pulses having a second predetermined value when the gains of said second pair of adjacent channels are equal, reference generator means coupled to said switching means for producing a recurrent reference voltage, the magnitude of said reference voltage having a first value during said first monitoring intervals equal to the predetermined value of said first video output pulses, the magnitude of said reference voltage having a second fixed value during said second monitoring intervals equal to the predetermined value of said second video output pulses, and indicator means coupled to the output of said computer means and to the output of said reference generator means, said indicator means indicating the difference between said first and second video output pulses and said recurrent reference voltage from said reference generator means.

3. In a gain monitoring system for a multi-channel receiving system, said gain monitoring system including a pilot pulse generator means producing recurrent pulse-modulated pilot signals to be received by each channel of said multi-channel receiving system, means for comparing the gains of adjacent channels of said multi-channel receiving system comprising in combination, switching means coupled between said pilot pulse generator means and said multi-channel receiving system for recurrently activating during first time intervals a first pair of adjacent channels whose gains are to be compared, computer means coupled to the output of said receiving system and responsive to the output pulses from said first pair of adjacent channels during said first time intervals for producing video output pulses whose magnitude varies according to the ratio of the voltage gains of said first pair of adjacent channels, the magnitude of said video output pulses having a predetermined value when the gains of said first pair of adjacent channels are equal, reference generator means coupled to said switching means for producing a recurrent reference voltage, the magnitude of said reference voltage during said first time intervals having a fixed value equal to the predetermined value of said video output pulses from said computer means when the gains of said adjacent channels are equal, sweep generator means coupled to said pilot pulse generator means for producing a recurrent sweep voltage occurring during said first time intervals, cathode-ray tube indicator means having a vertical deflection circuit and a horizontal deflection circuit, means coupling said video output pulses from said computer means and said recurrent reference voltage from said reference generator means to the vertical deflection circuits of said cathode-ray tube indicator means, and means coupling said recurrent sweep voltage from said sweep generator means and said recurrent reference voltage from said reference generator means to the horizontal deflection circuits of said cathode-ray tube indicator means, said cathode-ray tube indicator means indicating the difference between said video output pulses and said recurrent reference voltage.

4. In a gain monitoring system for a multi-channel receiving system, said gain monitoring system including a pilot pulse generator means producing recurrent pulse-modulated pilot signals to be received by each channel of said multi-channel receiving system, means for comparing the gains of a first pair of adjacent channels during first monitoring intervals and a second pair of adjacent channels during second monitoring intervals comprising in combination, switching means coupled between said pilot pulse generator means and said multi-channel receiving system for recurrently activating said first pair of adjacent channels during first monitoring intervals and for recurrently activating said second pair of adjacent channels during second monitoring intervals, means coupled to the output of said receiving system and responsive to the output pulses from said first pair of adjacent channels during said first monitoring intervals, said means producing first video output pulses whose magnitude varies according to changes in the gains of said first pair of adjacent channels, the magnitude of said first video output pulses having a first predetermined value when the gains of said first pair of adjacent channels are equal, said means being further responsive to the output pulses from said second pair of adjacent channels during said second monitoring intervals, said means producing second video output pulses whose magnitude varies according to changes in the gains of said second pair of adjacent channels, the magnitude of said second video output pulses having a second predetermined value when the gains of said second pair of adjacent channels are equal, reference generator means coupled to said switching means for producing a recurrent reference voltage, the magnitude of said reference voltage having a first value during said first monitoring intervals equal to the predetermined value of said first video output pulses when the gains of said first pair of channels are equal, the magnitude of said reference voltage having a second fixed value during said second monitoring intervals equal to the predetermined value of said second video output pulses when the gains of said second pair of adjacent channels are equal, sweep generator means coupled to the output of said pilot pulse generator means for producing a recurrent sweep voltage occurring during said first and second monitoring intervals, cathode-ray tube indicator means having a vertical deflection circuit and a horizontal deflection circuit, first combining means coupled to the output of said means producing said first and second video output pulses and said reference generator means, said first combining means coupling said first and second video output pulses and said reference voltage to the vertical deflection circuit of said cathode-ray tube indicator means, second combining means coupled to the output of said reference generator means and said sweep generator means, said second combining means coupling said reference voltage and said recurrent sweep voltage to the horizontal deflection circuit of said cathode-ray tube indicator means, said cathode-ray tube indicator means indicating the difference between said first video output pulses and the first value of said reference voltage during said first monitoring intervals and indicating the difference between said second video output pulses and the second value of said reference output voltage during said second monitoring intervals.

5. Apparatus for monitoring the gains of first and second receiving channels of a plural-channel receiver system, including means for applying pulse modulated pilot signals to the inputs of said channels, means responsive to the resulting outputs of said channels to produce a voltage representing the ratio of the gains of said channels, the magnitude of said voltage having a predetermined value when said ratio is unity, means for producing a reference voltage of said predetermined magnitude, and means for indicating the difference between said first mentioned voltage and said reference voltage.

References Cited in the file of this patent

UNITED STATES PATENTS

| | | |
|---|---|---|
| 2,467,361 | Blewett | Apr. 12, 1949 |
| 2,784,400 | Ehrenfried | Mar. 5, 1957 |